United States Patent [19]

Lee

[11] Patent Number: 5,247,367
[45] Date of Patent: Sep. 21, 1993

[54] CIRCUIT FOR CONTROLLING THE ELECTRONIC SHUTTER SPEED OF A VIDEO CAMERA

[75] Inventor: Jae-sin Lee, Seoul, Rep. of Korea
[73] Assignee: SamSung Electronics Co., Ltd., Kyungki, Rep. of Korea
[21] Appl. No.: 804,704
[22] Filed: Dec. 11, 1991
[51] Int. Cl.⁵ .................. H04N 5/238; H04N 5/335
[52] U.S. Cl. .............................. 358/213.19; 358/228; 358/209
[58] Field of Search .............. 358/228, 213.19, 209, 358/213.13; 250/208.1; 354/410

[56] References Cited

U.S. PATENT DOCUMENTS 4,782,394 11/1988 Hieda et al. ............... 358/213.19
4,984,002 1/1991 Kokubo ..................... 358/213.13
5,097,340 3/1992 Tanabe et al. .............. 358/213.19

FOREIGN PATENT DOCUMENTS 61-35684 2/1986 Japan ........................... 5/335

Primary Examiner—Michael T. Razavi
Assistant Examiner—Tuan V. Ho
Attorney, Agent, or Firm—Robert E. Bushnell

[57] ABSTRACT

A circuit for controlling the speed of an electronic shutter for a video camera using a CCD comprises a light intensity detector, a first generator, a second generator, and a comparator/controller, wherein the electronic shutter speed is controlled by adaptively varying a duration of the light storage of the CCD for every vertical period in response to a light intensity of an object.

23 Claims, 5 Drawing Sheets

FIG. 5C

CIRCUIT FOR CONTROLLING THE ELECTRONIC SHUTTER SPEED OF A VIDEO CAMERA

BACKGROUND OF THE INVENTION

The present invention relates to a video camera, and more particularly to a circuit for controlling an electronic shutter speed of a video camera which is capable of obtaining sharper picture quality by adaptively varying the shutter speed according to light intensity when detecting a driving voltage of a diaphragm of the video camera, so as to enable the the video camera to photograph an object above a certain light intensity.

For an ordinary video camera, a charge-coupled device (CCD) is used as an image sensor to store light for a predetermined period and read an object. In an NTSC system, the time for light storage is one vertical period (1 V or 1/60 sec), so in a PAL system, the light-storage time is 1/50 sec. Thus, the diaphragm is always open, and since the shutter speed is fixed, the amount of light incident upon the image sensor is varied by the driving of the diaphragm.

In other words, in order to maintain a constant amount of incident light, the aperture of the diaphragm narrowly shuts for bright objects and widens for dark objects. A high-speed electronic shutter speed has a shorter time for storing light in the image sensor and consequently enables a sharper picture, similarly to a higher shutter speed in an ordinary still camera.

SUMMARY OF THE INVENTION

Therefore, it is an object of the present invention to provide a circuit for controlling the electronic shutter speed for a video camera which incorporates a function of a high speed electronic shutter into the video camera using a CCD so as to photograph a sharper image.

To achieve the object, in a video camera using a CCD, the circuit for controlling the electronic shutter speed for a video camera of the present invention comprises a light intensity detector for inputting a diaphragm driving voltage and comparing it with lower limit and upper limit reference voltages corresponding to the light intensity of an object so as to detect high and low light intensities, a first generator for counting up and down a horizontal clock pulse signal in response to the output of the light intensity detector and generating a compared value proportional to a detection period of high and low light intensities, a second generator for counting up the horizontal clock pulse signal and generating a reference value for every vertical period, and a comparator/controller for comparing the outputs of the first and second generators and interrupting the supply of the horizontal driving pulse to the CCD to control the light storage time of the CCD when the reference value is greater than the compared value, whereby the shutter speed is controlled by adaptively varying a duration of the light storage time of the CCD for every vertical period in response to the light intensity of said object.

BRIEF DESCRIPTION OF THE DRAWINGS

The above object and other advantages of the present invention will become more apparent by describing in detail a preferred embodiment of the present invention with reference to the attached drawings in which:

FIGS. 5A to 5E are waveform diagrams of various components shown in FIGS. 2 and 3.

DETAILED DESCRIPTION OF THE INVENTION

Figure 1:
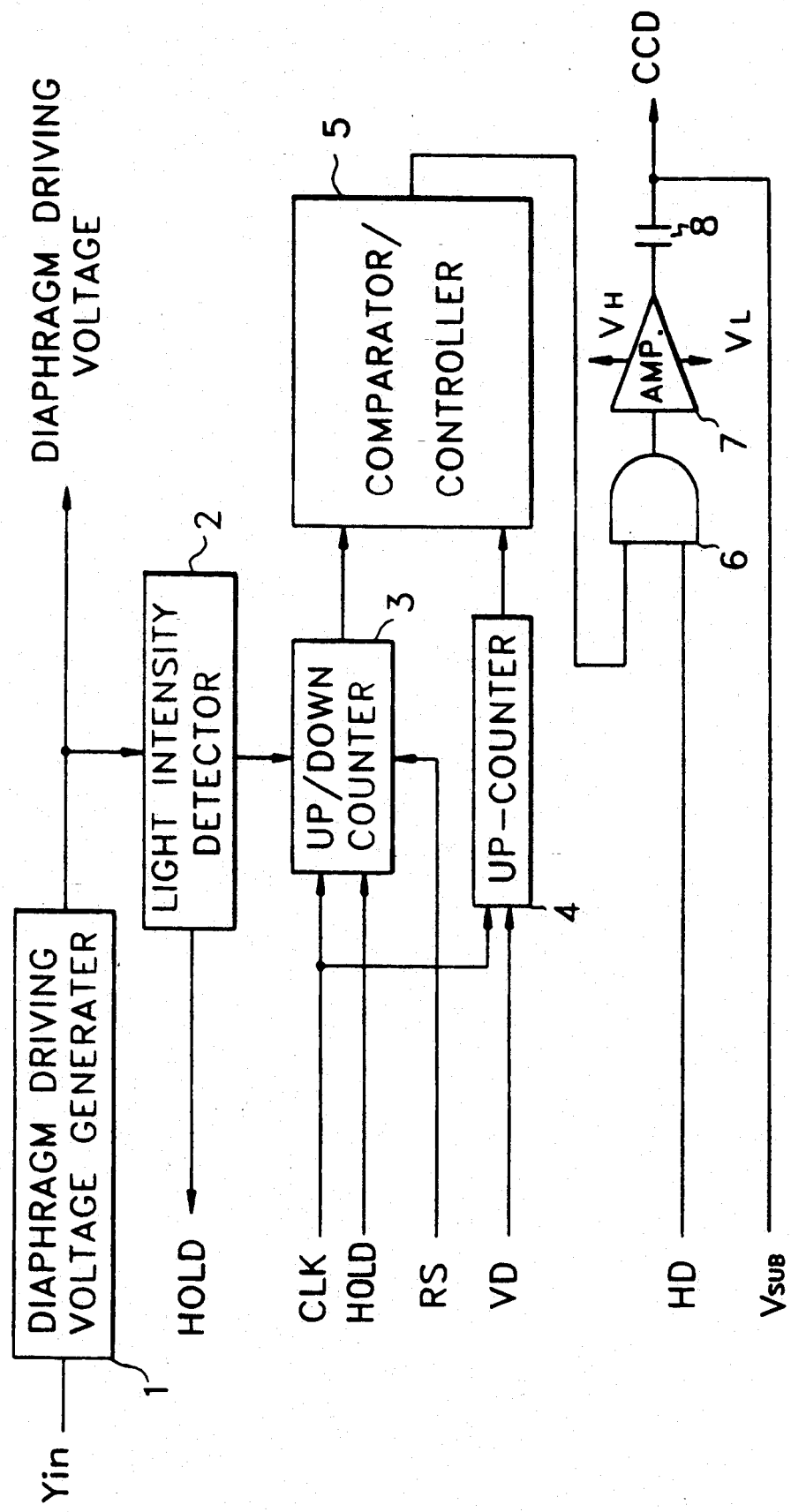
FIG. 1 is a block diagram of a circuit for controlling the speed of the electronic shutter according to the present invention.

Referring to FIG. 1, the circuit of the present invention, in a video camera using a CCD and having a diaphragm driving voltage generator 1 for detecting a driving voltage and driving a diaphragm, comprises a light intensity detector 2 for sensing a light intensity of a photographed object using a diaphragm driving voltage from the diaphragm driving voltage generator 1, a first generator consisting of a up/down counter 3 being reset by a reset signal RS for counting up and down a clock CLK according to the output of the light intensity detector 2 and holding the counted value according to a hold signal HOLD, a second generator consisting of a up-counter 4 for up-counting at horizontal pulse CLK and being reset at every vertical period by a vertical driving pulse signal VD, a comparator/controller 5 for comparing the outputs of the up/down counter 3 and the up counter 4 and outputting a pulse for controlling a period of the light storage, an AND gate 6 for logically multiplying the output of the comparator/controller and the horizontal driving pulse signal HD, and an amplifier 7 for amplifying the output of the AND gate 6. The output of the amplifier 7 is biased by a CCD substrate voltage $V_{SUB}$ and supplied to the CCD.

Figure 2:
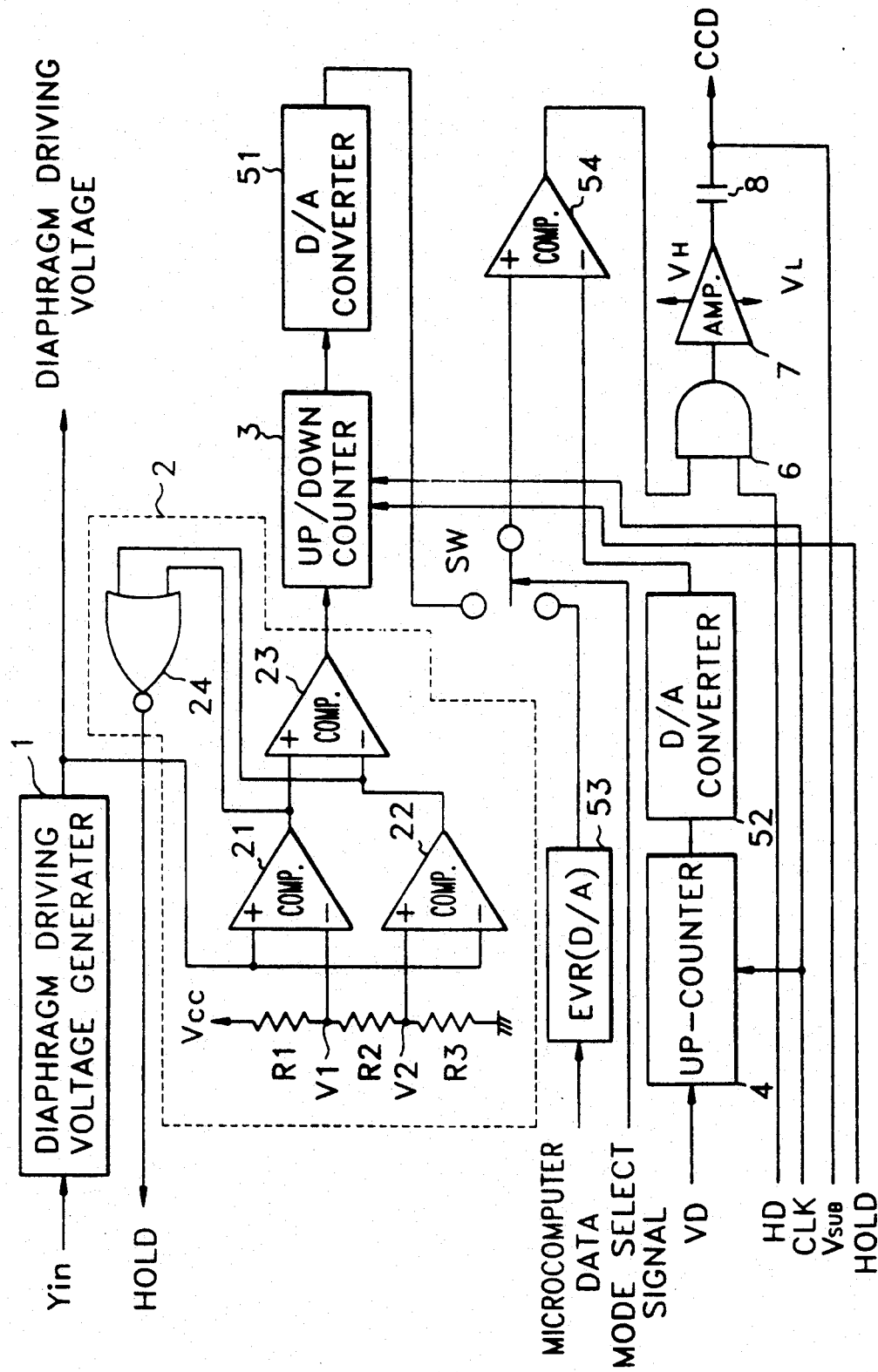
FIG. 2 is a block diagram of one embodiment of a circuit for controlling the speed of the electronic shutter according to the present invention.

Referring to FIG. 2 illustrating an embodiment of the circuit according to the present invention, a light intensity detector 2 comprises first and second comparators 21 and 22 for comparing a diaphragm driving voltage generated from a diaphragm driving voltage generator 1 and a reference voltage set by first, second and third resistors $R_1$, $R_2$, $R_3$, i.e., to detection upper and a lower limit of a light intensity, a NOR gate 24 for logically combining the outputs of the first and second comparators 21 and 22 to generate a hold signal to a microcomputer (not shown), and a third comparator 23 for comparing the outputs of the first and second comparators 21 and 22. The outputs of an up/down counter 3 and an up counter 4 are converted into respective analog signals by digital-to-analog (D/A) converters 51 and 52 to be compared by a comparator 54. An analog switch SW is constructed so that a mode select signal from the microcomputer selects the output of the up/down counter 3 or the output of a third generator (that is, an electric variable resistor: EVR) to which data of the microcomputer is applied.

Figure 3:
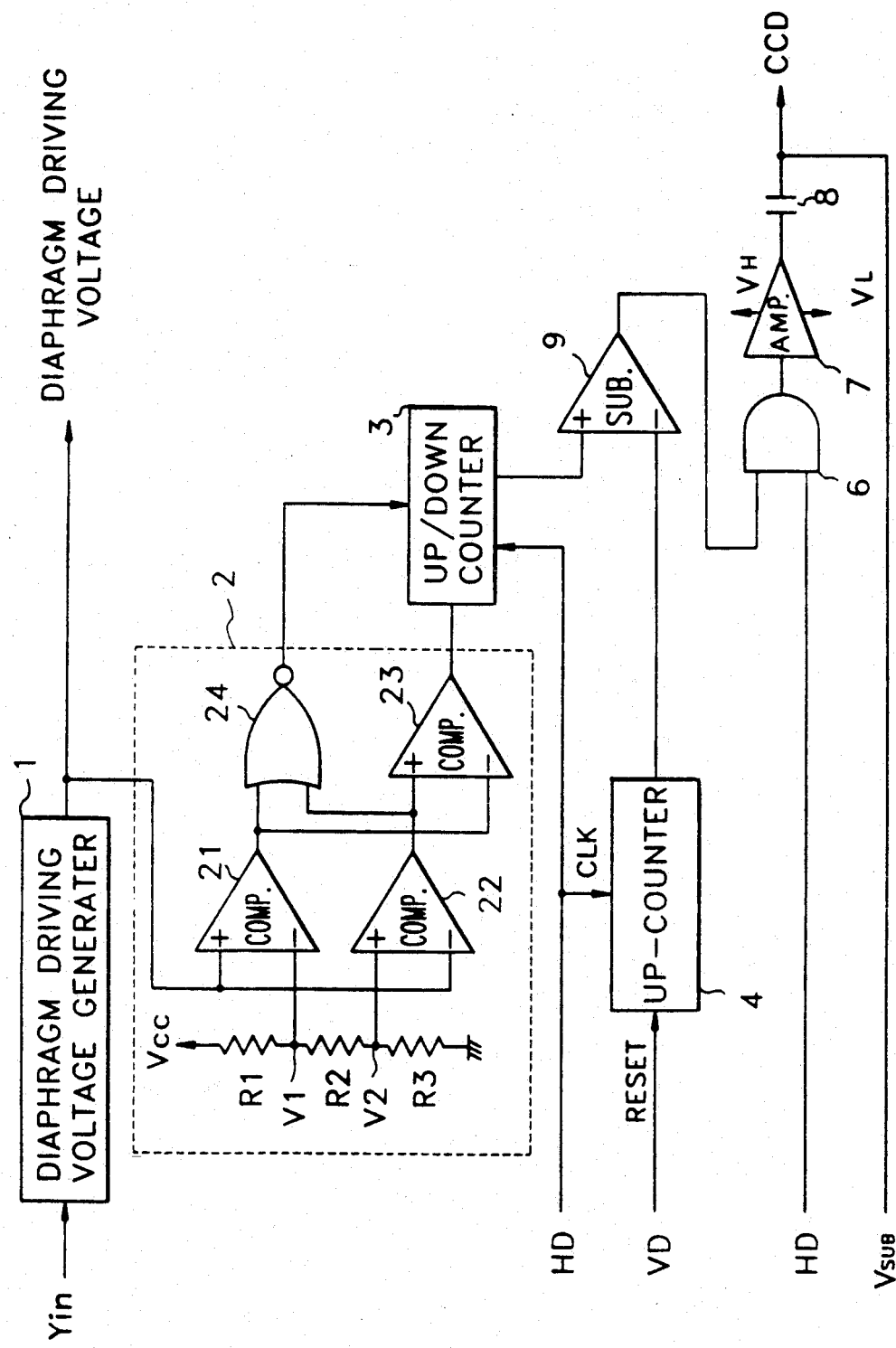
FIG. 3 is a block diagram of another embodiment of a circuit for controlling the speed of the electronic shutter according to the present invention.

Referring to FIG. 3 illustrating another embodiment of the circuit according to the present invention, the output of a light intensity detector 2 is applied to an up/down counter 3. The difference between the outputs of the up/down counter 3 and an up counter 4 is obtained in a subtracter 5 and applied to an AND gate 6.

Figure 6:
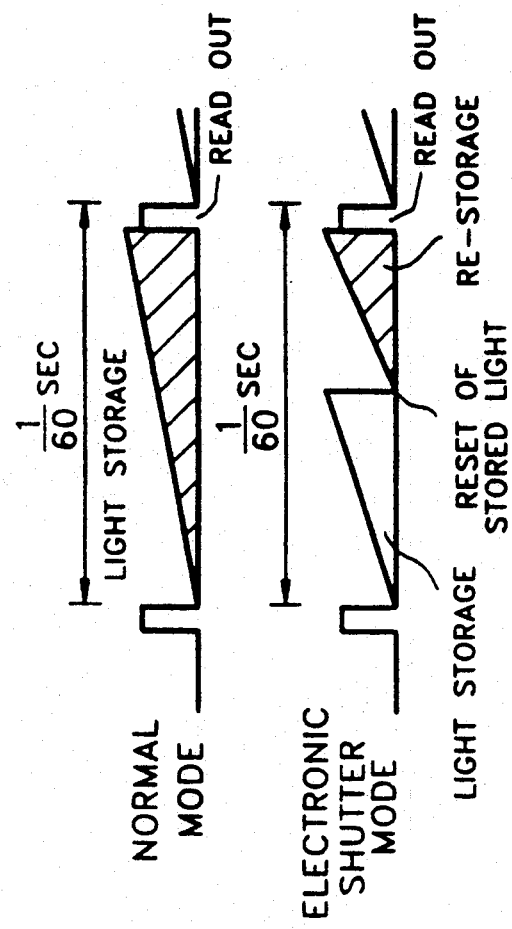
FIG. 6 illustrates the light storage operations of the CCD during a normal mode and a high-speed shutter mode according to the present invention.

First, a difference between the normal and an electronic shutter mode in an NTSC system will be described with respect to the light storage and read-out durations, referring to FIGS. 4 to 6.

During a normal mode, a read-out operation is performed after the light is stored for one field (one vertical period). During an electronic shutter mode, when a stored electric charge is reset after a first light storage period, light is stored again from the first light storage period. Only the restored light (oblique-lined portion) is output during the read-out operation which effects a high speed control of the shutter.

According to this principle, 1/60th of a second is divided by 256 using 8 bits to set a reset period, so that a fastest electronic shutter operation obtainable is 1/15,360th of a second. This concept of having an electronic shutter operates at 1/15,360th of a second presents no practical problem to an ordinary video camera because in reality, an ordinary shutter operation of 1/10,000th of a second is sufficient for any video camera. Therefore, it can be seen that a faster shutter operation of 1/15,360th of a second can be adapted to any ordinary video camera.

Figure 4:
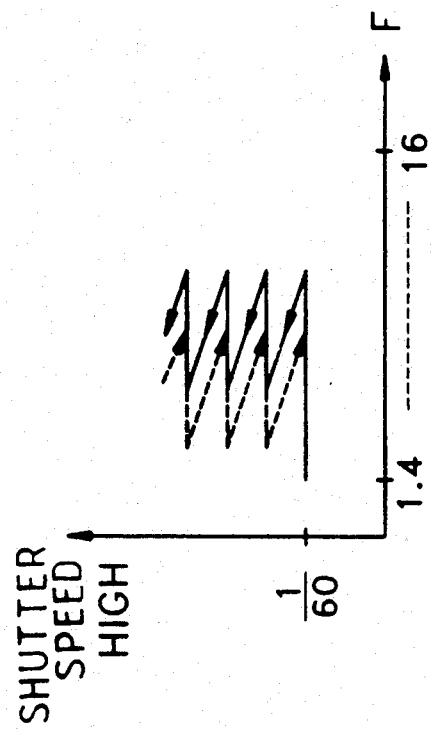
FIG. 4 is a graph illustrating the relationship between the opening of the diaphragm and the speed of the electronic shutter according to the present invention.

The solid line shown in FIG. 4 represents a high light intensity condition, and the dotted line represents a low light intensity condition.

The operation of the circuit of the present invention is as follows:

Referring to FIG. 1, a diaphragm driving voltage generator 1 senses an input level of a luminance signal to generate a diaphragm driving voltage, and a light intensity detector 2 detects the generated diaphragm driving voltage. An up/down control signal output from the light intensity detector 2 is applied to a 8-bit up/down counter 3. A counter holding the control signal output from the light detector 2 is also applied to the microcomputer for deciding a proper electronic shutter mode.

According to the output of the light intensity detector 2, the up/down counter 3 counts up or down a horizontal clock pulse signal CLK and applies the output pulses to a comparator/controller 5. The microcomputer applies two signals to the up/down counter 3: a reset signal RS to reset it and a hold signal for holding the up/down counter during a proper electronic shutter mode.

An up-counter 4 resets at every vertical period by a vertical driving pulse VD and counts up the horizontal clock pulse CLK to apply the result to the comparator/controller 5.

The comparator/controller 5 compares the outputs of the up/down counter 3 and the up-counter 4 and varies and outputs the width of a pulse having a width corresponding to a period of light storage during the electronic shutter mode.

The output waveform of the comparator/controller 5 is logically multiplied by the horizontal driving pulse HD in the AND gate 6 and sufficiently amplified to reset the CCD by the amplifier 7 to be loaded onto the substrate voltage $V_{SUB}$ of the CCD and be applied to the CCD.

Now, an embodiment of the present invention will be described with reference to FIG. 3.

Referring to FIG. 3, a diaphragm driving voltage detected from the diaphragm driving voltage generator 1 is fed to a noninverting port of the comparator 21 and an inverting port of the comparator 22 of the light intensity detector 2, and first and second reference voltages $V_1$ and $V_2$ set by the resistors $R_1$, $R_2$ and $R_3$ are fed to the inverting port of the comparator 22 and the noninverting port of the comparator 22. Here, a first reference voltage $V_1$ is expressed as:

$$V_1 = \frac{(R_2 + R_3)Vcc}{R_1 + R_2 + R_3} \text{ and}$$

a second reference voltage $V_2$ is expressed as:

$$V_2 = \frac{R_3 Vcc}{R_1 + R_2 + R_3}$$

Accordingly, when the diaphragm driving voltage $V_1$ is higher than the first reference voltage $V_1$ (that is, when the light intensity is low), the comparator 21 outputs a high potential signal. Conversely, when the diaphragm driving voltage is lower than the second reference voltage $V_2$ (that is, when the light intensity is high), the comparator 22 outputs a high potential signal. Since the output of the comparator 21 is fed to an inverting port of the comparator 23 and the output of the comparator 22 is fed to a noninverting port, the comparator 23 outputs a high potential signal representative of a high light intensity and outputs a low potential signal representative of a low light intensity. A truth table of the operational state of the up/down counter 3 according to the outputs of the comparators 21, 22, 23 and the NOR gate 24 is shown as follows:

| comparator 21 | comparator 22 | comparator 23 | NOR gate 24 | function |
|---|---|---|---|---|
| H | L | L | L | down-counter |
| L | H | H | L | up-counter |
| L | L | — | H | holding |

That is, when the diaphragm driving voltage is higher than the second reference voltage $V_2$ or lower than the first reference voltage $V_1$, the output of the NOR gate 24 is high so that the up/down counter 3 stops counting and holds its value. When the diaphragm driving voltage is lower than the second reference voltage $V_2$ (high light intensity), the output of the comparator 23 is low so that the up/down counter 3 counts down.

At this time, a horizontal clock pulse CLK shown in FIG. 5C is fed to the up/down counter 3 and also to the up-counter 4. The up-counter 4 is reset every field by a vertical driving pulse VD shown in FIG. 5B and performs only up-counting.

The up/down counter counts a horizontal clock pulse CLK. Since one horizontal period is 63.5 μs, this period can be varied for one bit, and since the present invention uses 8 bits, $2^8$ or 256 bits can be varied.

Referring back to FIG. 3, the output of the 8-bit up/down counter 3 is fed to a positive port of the subtracter 9 and the output of the up-counter 4 is fed to a negative port, in order to obtain a difference. If the result is positive, a high potential signal is output: and if the result is negative, a low potential signal is output. The outputs of the up/down counter 3 and the up counter 4 are compared so that the subtracter 9 outputs a high potential signal until the outputs are equivalent. When the outputs are equal, the subtracter 9 outputs a low potential signal. As a result, the subtracter 9 outputs the pulse waveform as shown in FIG. 5D.

Figure 5A:
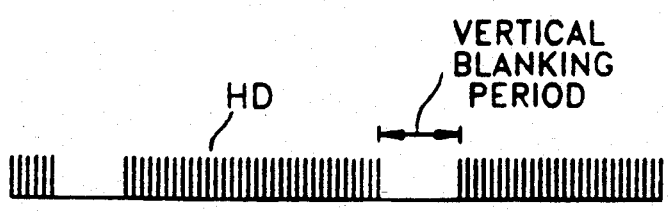
Figure 5B:
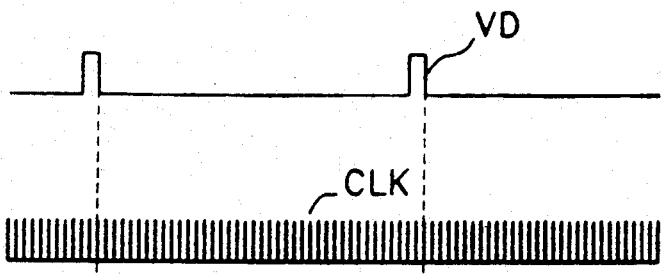
Figure 5D:
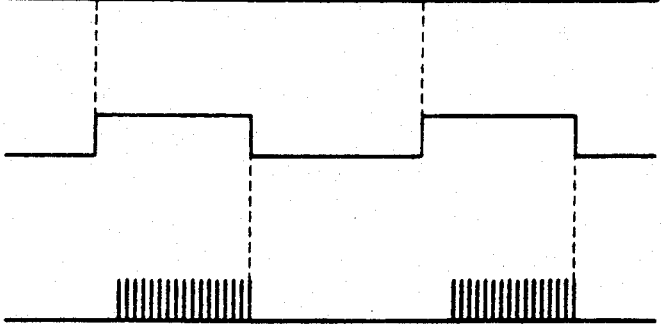

The output of the subtracter 9 is fed to the AND gate 6 and logically multiplied by a horizontal driving pulse HD as shown in FIG. 5A. The AND gate 6 outputs a pulse shown in FIG. 5E which is sufficiently amplified to reset the CCD by the amplifier 7. The amplified pulse is loaded onto the substrate voltage $V_{SUB}$ of the CCD via a coupling condenser 8 and fed to the CCD.

Figure 5E:
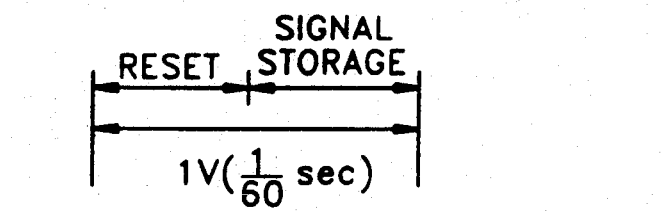

In other words, in the waveform shown in FIG. 5E, storage of a signal does not occur during a period when the horizontal driving pulse is present; the signal is stored only during the period when the horizontal driving pulse is not present. This principle allows the object of the present invention to be accomplished.

Since the circuit of the present invention operates in a negative feedback as a whole and operates prior to the driving of the diaphragm, the shutter speed is preferentially controlled.

So far, embodiments of the present invention as illustrated in FIGS. 1 and 3 have been described as not being controlled by a microcomputer. FIG. 2 illustrates embodiment of the present invention which is controlled by the microcomputer as follows:

The embodiment of FIG. 2 is similar to that of FIG. 3. The feature of the embodiment of FIG. 2 is that the circuit for controlling the electronic shutter speed is controlled by the microcomputer and replace a subtracter 9 with a simple comparator 54.

The diaphragm driving voltage of diaphragm driving voltage generator 1 is detected by the light intensity detector 2 in the same manner as FIG. 3. However, the output of the NOR gate 24 is fed to a microcomputer (not shown).

The outputs of the up/down counter 3 and the up-counter 4 are respectively converted to analog signals by a D/A converters 51 and 52 and fed to a comparator 54.

If the output of the up-counter 4 is greater than the output of the up/down counter 3, the comparator 54 outputs a low potential signal (the waveform shown in FIG. 5D).

The up-counter 4 is reset at every vertical period in the same manner as FIG. 3.

Both the output of the up/down counter 3 via the D/A converter 51 and the output of an electric variable resistor 53 (EVR) which receives data from the microcomputer are applied to an analog switch SW so as to be selected by a mode select signal. Therefore, since the analog switch SW is switched by the mode select signal from the microcomputer, the outputs of the up/-down counter 3 and the EVR 53 are selectively fed to a noninverting port of the comparator 54.

Here, since the EVR 53 receives data from the microcomputer and outputs an analog signal corresponding to the data, if the microcomputer applies a programmed value to the EVR 53 and the analog switch SW selects the EVR 53, the circuit for controlling the electronic shutter speed operates at a programmed electronic shutter speed regardless of the operation of the light intensity detector 2.

As described above in detail, the circuit for controlling the speed of an electronic shutter of the present invention sets an appropriate speed of the electronic shutter in advance by detecting a light intensity of an object with a diaphragm driving voltage, and varies the electronic shutter speed for an object above a certain light intensity, thereby acquiring better picture quality.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A circuit for controlling the speed of an electronic shutter of a video camera using a device for sensing an image, comprising:

light intensity detector means coupled to receive a driving signal for drawing a diaphragm to vary an amount of light incident upon the device, said light intensity detector means being for comparing said driving signal with lower and upper references corresponding to a light intensity of an object to detect high and low light intensities;

first generator means for providing an output by counting up and down a number of horizontal clock pulses in response to the output of said light intensity detector means to generate a compared value proportional to a detection period of said high and low light intensities;

second generator means for providing an output by counting up said horizontal clock pulses to generate a reference value for every vertical period; and controller means for comparing the outputs of said first and second generator means and for interrupting application of the horizontal clock pulses to the device to provide an output to control a light storage time of the device when the reference value is greater than the compared value, wherein the speed of said electronic shutter is controlled by adaptively varying a duration of said light storage time of the device for every vertical period in response to the light intensity of said object.

2. The circuit for controlling the speed of an electronic shutter of a video camera as claimed in claim 1, wherein said light intensity detector means comprises:

lower limit detector means for providing an output by comparing said driving signal with said lower reference of said light intensity to detect a low light intensity state of said driving signal;

upper limit detector means for providing an output by comparing said driving signal with said upper reference voltage of said light intensity to detect a high light intensity state of said driving signal; and logic means for logically combining the outputs of said lower and upper detector means.

3. The circuit for controlling the speed of an electronic shutter of a video camera as claimed in claim 2, wherein said light intensity detector means comprises:

lower limit detector means for providing an output by comparing said driving signal with said preset lower reference of the light intensity of said object to detect a low light intensity state of said driving signal;

upper limit detector means for providing an output by comparing said driving signal with said preset upper reference of the light intensity of said object to detect a high light intensity state of said driving signal; and logic means for logically combining the outputs of said lower and upper detector means to generate a holding control signal to said first generator means.

4. The circuit for controlling the speed of an electronic shutter of a video camera as claimed in claim 1, further comprising:

logic means for logically combining the output of said controller means and a horizontal driving pulse to provide a logic signal representative of a selected duration of said light storage time of the device;

amplifier means for amplifying said logic signal to provide an amplified signal; and means for biasing said amplified signal and transporting said amplified signal to the device.

5. A circuit for controlling the speed of an electronic shutter of a video camera using a device for sensing an image, comprises:

light intensity detector means coupled to receive a driving signal for driving a diaphragm to vary an amount of light incident upon the device, for comparing said driving signal with preset lower and upper references corresponding to light intensity of an object to detect high and low light intensities;

first generator means for providing an output by counting up and down a number of horizontal clock pulses in response to the output of said light intensity detector means to generate a first comparing value proportional to a detection period of said high and low light intensities;

second generator means for providing an output by generating a second comparing value proportional to a set value of a selected shutter speed;

switch means for enabling selection of one of the outputs from said first and second generator means according to a mode setting;

third generator means for counting up the horizontal clock pulses to generate a reference value for every vertical period; and controller means for comparing the outputs of said switch means and said third generator means, and for interrupting application of the horizontal driving pulses to the device to control a light storage time of the device when the reference value is greater than the compared value, wherein the speed of said electronic shutter is controlled by adaptively varying a duration of the light storage time of the device for every vertical period in response to the light intensity of said object.

6. The circuit for controlling the speed of an electronic shutter of a video camera as claimed in claim 5, further comprising:

logic means for logically combining the output of said controller means and a horizontal driving pulse to provide a logic signal representative of a selected duration of said light storage time of the device;

amplifier means for amplifying said logic signal to provide an amplified signal; and means for biasing said amplified signal and transporting said amplified signal to the device.

7. A circuit for controlling an electronic shutter speed of a video camera, comprising:

means for receiving a driving signal for driving a diaphragm to vary an amount of light incident upon an image sensor;

means for detecting a light intensity of an object for making a comparison with said driving signal to provide a detected signal;

first counter means for performing one of an up-counting operation and a down-counting operation of a number of horizontal clock pulses in dependence upon said detected signal to provide a first counted signal;

second counter means for performing said up-counting operation of a number of said horizontal clock pulses for each vertical clock pulse representative of a field period to provide a second counted signal; and means for controlling said electronic shutter speed of said video camera by adaptively varying a duration of a light storage time of the image sensor in dependence upon a comparison of said first and second counted signals.

8. The circuit for controlling an electronic shutter speed of a video camera as claimed in claim 7, wherein said light intensity detecting means comprises:

first comparator means for comparing said driving signal with a lower reference of the light intensity of said object to detect a low light intensity state of said driving signal;

second comparator means for comparing said driving signal with an upper reference of the light intensity of said object to detect a high light intensity state of said driving signal;

third comparator means for enabling one of said up-counting operation and said down-counting operation of said first counter means in dependence upon reception of the outputs of said first and second comparator means; and means for disabling both said up-counting operation and said down-counting operation of said first counter means when said driving signal is greater than said upper reference or less than said lower reference.

9. The circuit for controlling an electronic shutter speed of a video camera as claimed in claim 7, wherein said electronic shutter speed controlling means comprises:

means for comparing said first and second counted signals to provide a compared signal;

logic means for controlling application of said horizontal clock pulses to the image sensor by logically combining said compared signal with said horizontal clock pulses to provide a logic signal representative of a selected duration of said light storage time of the image sensor;

amplifier means for amplifying said logic signal to provide an amplified signal; and means for biasing said amplified signal and transporting said amplified signal to the image sensor.

10. The circuit for controlling an electronic shutter speed of a video camera as claimed in claim 8, wherein said electronic shutter speed controlling means comprises:

means for comparing said first and second counted signals to provide a compared signal;

logic means for controlling application of said horizontal clock pulses to the image sensor by logically combining said compared signal with said horizontal clock pulses to provide a logic signal representative of a selected duration of said light storage time of the image sensor;

amplifier means for amplifying said logic signal to provide an amplified signal; and means for biasing said amplified signal and transporting said amplified signal to the image sensor.

11. A method for controlling an electronic shutter speed of a video camera, comprising the steps of:

receiving a driving signal for driving a diaphragm to vary an amount of light incident upon an image sensor;

detecting a light intensity of an object for making a comparison with said driving signal to provide a detected signal;

performing one of an up-counting operation and a down-counting operation of a number of said horizontal clock pulses in dependence upon said detected signal to provide a first counted signal;

performing said up-counting operation of said number of horizontal clock pulses for each vertical clock pulse representative of a field period to provide a second counted signal; and controlling said electronic shutter speed of said video camera by adaptively varying a duration of a light storage time of the image sensor in dependence upon a comparison of said first and second counted signals.

12. The method for controlling an electronic shutter speed of a video camera as claimed in claim 11, wherein said light intensity detecting step further comprises:

comparing said driving signal with a lower reference of the light intensity of said object to detect a low light intensity state of said driving signal;

comparing said driving signal with an upper reference of the light intensity of said object to detect a high light intensity state of said driving signal;

enabling one of said up-counting operation and said down-counting operation in dependence upon detection of said low and high light intensity states of said driving signal; and disabling both of said up-counting operation and said down-counting operation when said driving signal is greater than said upper reference or less than said lower reference.

13. The circuit for controlling an electronic shutter speed of a video camera as claimed in claim 11, wherein said electronic shutter speed controlling step further comprises:

comparing said first and second counted signals to provide a compared signal;

controlling application of said horizontal clock pulses to the image sensor by logically combining said compared signal with said horizontal clock pulses to provide a logic signal representative of a selected duration of said light storage time of the image sensor;

amplifying said logic signal to provide an amplified signal; and biasing said amplified signal and transporting said amplified signal to the image sensor.

14. A circuit for controlling speed of a shutter of a camera using a device for sensing an image, comprising:

detector means for receiving a driving signal for driving a diaphragm to vary light impinging upon the device, and for generating an intensity signal by comparing said driving signal with lower and upper references corresponding to light intensity of an object;

generator means for providing a first value proportional to a detection period of said high and low light intensities by making up and down counts of horizontal clock pulses in response to said intensity signal, and for providing a second value by counting said horizontal clock pulses in dependence upon occurrence of vertical periods; and controller means for varying a duration of a light storage time of the device for each vertical period by making a comparison of said first value and said second value and interrupting application of said horizontal clock pulses to the device in dependence upon said comparison.

15. The circuit of claim 14, comprised of said controller means further comprising interrupting application of said horizontal clock pulses to the device when said second value if greater than said first value.

16. The circuit of claim 14, comprised of said generator means further comprising:

first means for providing said first value proportional to said detection period by counting up and down said horizontal clock pulses in response to said intensity signal; and second means for providing said second value by counting up said horizontal clock pulses.

17. The circuit of claim 14, wherein said detector means comprises:

first comparator means for comparing said driving signal with a lower reference of the light intensity of said object to detect a low light intensity state of said driving signal;

second comparator means for comparing said driving signal with an upper reference of the light intensity of said object to detect a high light intensity state of said driving signal;

third comparator means for marking one of said up and down counts in dependence upon the high and low intensity states of said driving signal; and means for disabling both said up and down counts when said driving signal is greater than said upper reference or less than said lower reference.

18. The circuit of claim 14, wherein said controller means comprises:

means for comparing said first and second values to provide a compared value;

logic means for controlling application of said horizontal clock pulses to the device by logically combining said compared value with said horizontal clock pulses to provide a logic signal representative of a selected duration of said light storage time of the device;

amplifier means for amplifying said logic signal to provide an amplified signal; and means for biasing said amplified signal and transporting said amplified signal to the device.

19. The circuit of claim 18, wherein said controller means varies the speed of said shutter in accordance with the light intensity of said object in dependence upon said amplified signal.

20. The circuit of claim 14, wherein said controller means varies the speed of said shutter in accordance with the light intensity of said object.

21. The circuit of claim 14, wherein said comparing means comprises:

first comparator means for comparing said driving signal with a lower reference of the light intensity of said object to detect a low light intensity state of said driving signal;

second comparator means for comparing said driving signal with an upper reference of the light intensity of said object to detect a high light intensity state of said driving signal;

third comparator means for enabling one of said up and down counts in dependence upon the high and low intensity states of said driving signal; and means for disabling both said up and down counts when said driving signal is greater than said upper reference or less than said lower reference.

22. A circuit for controlling speed of a shutter of a camera using an image sensor, comprising:
   means for receiving a driving signal for driving a diaphragm of a camera to vary light impinging upon said image sensor;
   means for comparing said driving signal with lower and upper references corresponding to light intensity of an object;
   means for generating a first value proportional to a detection period of high and low light intensity states of said driving signal, and for generating a second value by counting a number of said horizontal clock pulses in dependence upon occurrence of vertical periods; and
   controller means for controlling speed of the shutter of said camera by varying a duration of a light storage time of said image sensor in dependence upon said first and said second values.

23. The circuit of claim 22, wherein said controller means comprises:
   means for comparing said first and second values to provide a compared value;
   logic means for controlling application of said horizontal clock pulses to said image sensor by logically combining said compared value with said horizontal clock pulses to provide a logic signal;
   amplifier means for amplifying said logic signal to provide an amplified signal; and
   means for biasing said amplified signal and transporting said amplified signal to said image sensor, said amplified signal being representative of a selected duration of said light storage time of said image sensor.

* * * * *

UNITED STATES PATENT AND TRADEMARK OFFICE
CERTIFICATE OF CORRECTION

PATENT NO. : 5,247,367
DATED : 21 September 1993
INVENTOR(S) : Jae-Sin Lee

It is certified that error appears in the above-indentified patent and that said Letters Patent is hereby corrected as shown below:

Column 2,

Line 50, replace "to detection" with --to detect an--;

Column 6,

Line 52, after "detection means", insert --to generate a holding control signal to said first generator means--.

Signed and Sealed this

Twenty-third Day of August, 1994

Attest:

BRUCE LEHMAN

Attesting Officer     Commissioner of Patents and Trademarks